(12) United States Patent
Benko et al.

(10) Patent No.: US 9,857,938 B2
(45) Date of Patent: Jan. 2, 2018

(54) PRECISE SELECTION TECHNIQUES FOR MULTI-TOUCH SCREENS

(71) Applicant: Microsoft Technology Licensing, LLC, Redmond, WA (US)

(72) Inventors: Hrvoje Benko, Seattle, WA (US); Andrew D. Wilson, Seattle, WA (US); Patrick M. Baudisch, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 419 days.

(21) Appl. No.: 14/136,786

(22) Filed: Dec. 20, 2013

(65) Prior Publication Data
US 2014/0109017 A1    Apr. 17, 2014

Related U.S. Application Data

(63) Continuation of application No. 13/295,982, filed on Nov. 14, 2011, now Pat. No. 8,619,052, which is a continuation of application No. 11/379,297, filed on Apr. 16, 2006, now Pat. No. 8,077,153.

(51) Int. Cl.
G06F 3/048         (2013.01)
G06F 3/0481        (2013.01)
G06F 3/0488        (2013.01)

(52) U.S. Cl.
CPC ........ *G06F 3/04812* (2013.01); *G06F 3/0488* (2013.01); *G06F 2203/04808* (2013.01)

(58) Field of Classification Search
CPC ......... G06F 2203/0381; G06F 3/04883; G06F 2203/04808
See application file for complete search history.

(56) References Cited

U.S. PATENT DOCUMENTS

| 4,546,349 A | 10/1985 | Prohofsky et al. |
| 5,187,776 A | 2/1993 | Yanker |
| 5,615,384 A | 3/1997 | Allard et al. |
| 5,621,438 A | 4/1997 | Kamimura et al. |
| 5,825,352 A | 10/1998 | Bisset et al. |
| 5,956,020 A | 9/1999 | D'Amico et al. |

(Continued)

OTHER PUBLICATIONS

Albinsson, et al., "High Precision Touch Screen Interaction", ACM, Proceedings of CHI '03, 2003, pp. 105-112.

(Continued)

*Primary Examiner* — William Bashore
*Assistant Examiner* — Rayeez Chowdhury
(74) *Attorney, Agent, or Firm* — Schwegman Lundberg & Woessner, P.A.

(57) ABSTRACT

A unique system and method is provided that facilitates pixel-accurate targeting with respect to multi-touch sensitive displays when selecting or viewing content with a cursor. In particular, the system and method can track dual inputs from a primary finger and a secondary finger, for example. The primary finger can control movement of the cursor while the secondary finger can adjust a control-display ratio of the screen. As a result, cursor steering and selection of an assistance mode can be performed at about the same time or concurrently. In addition, the system and method can stabilize a cursor position at a top middle point of a user's finger in order to mitigate clicking errors when making a selection.

19 Claims, 16 Drawing Sheets

(56) References Cited

U.S. PATENT DOCUMENTS

| | | | |
|---|---|---|---|
| 6,067,079 A | 5/2000 | Shieh | |
| 6,072,475 A | 6/2000 | van Ketwich | |
| 6,075,531 A | 6/2000 | DeStefano | |
| 6,094,197 A | 7/2000 | Buxton et al. | |
| 6,128,006 A | 10/2000 | Rosenberg et al. | |
| 6,278,443 B1 | 8/2001 | Amro et al. | |
| 6,323,846 B1 | 11/2001 | Westerman et al. | |
| 6,392,675 B1 | 5/2002 | Becker et al. | |
| 6,433,801 B1 | 8/2002 | Moon et al. | |
| 6,459,424 B1 | 10/2002 | Resman | |
| 6,590,568 B1 | 7/2003 | Astala et al. | |
| 6,628,285 B1 | 9/2003 | Abeyta et al. | |
| 6,690,387 B2 | 2/2004 | Zimmerman et al. | |
| 6,727,892 B1 | 4/2004 | Murphy | |
| 6,788,284 B1 | 9/2004 | Culler | |
| 6,795,055 B1 | 9/2004 | Culler | |
| 6,803,905 B1 | 10/2004 | Capps et al. | |
| 6,920,619 B1 | 7/2005 | Milekic | |
| 6,943,778 B1 | 9/2005 | Astala et al. | |
| 7,487,461 B2 | 2/2009 | Zhai et al. | |
| 8,077,153 B2 | 12/2011 | Benko et al. | |
| 8,619,052 B2 | 12/2013 | Benko et al. | |
| 2001/0015718 A1 | 8/2001 | Hinckley et al. | |
| 2002/0080123 A1 | 6/2002 | Kennedy et al. | |
| 2002/0135563 A1* | 9/2002 | Canakapalli | G06F 3/03543 345/163 |
| 2002/0175955 A1 | 11/2002 | Gourdol et al. | |
| 2003/0058217 A1* | 3/2003 | Hosomizu | G06F 3/038 345/156 |
| 2003/0063073 A1 | 4/2003 | Geaghan et al. | |
| 2003/0169231 A1 | 9/2003 | Rekimoto | |
| 2003/0210281 A1* | 11/2003 | Ellis | G06F 3/0481 715/838 |
| 2004/0017355 A1 | 1/2004 | Shim | |
| 2004/0165013 A1 | 8/2004 | Nelson et al. | |
| 2004/0178997 A1 | 9/2004 | Gillespie et al. | |
| 2004/0212605 A1 | 10/2004 | Fitzmaurice et al. | |
| 2005/0193351 A1 | 9/2005 | Huoviala | |
| 2006/0001650 A1* | 1/2006 | Robbins | G06F 3/0421 345/173 |
| 2006/0026521 A1* | 2/2006 | Hotelling | G06F 3/0418 715/702 |
| 2006/0059437 A1 | 3/2006 | Conklin, III | |
| 2006/0097991 A1* | 5/2006 | Hotelling | G06F 3/0416 345/173 |
| 2006/0132460 A1* | 6/2006 | Kolmykov-Zotov | G06F 3/04812 345/173 |
| 2006/0244735 A1 | 11/2006 | Wilson | |
| 2006/0288314 A1* | 12/2006 | Robertson | G06F 3/04842 715/863 |
| 2007/0106939 A1 | 5/2007 | Qassoudi | |
| 2007/0247435 A1 | 10/2007 | Benko et al. | |
| 2009/0191946 A1* | 7/2009 | Thomas | G07F 17/32 463/20 |
| 2012/0056840 A1 | 3/2012 | Benko et al. | |

OTHER PUBLICATIONS

Baudisch, et al., "Snap-and-go: Helping Users Align Objects Without the Modality of Traditional Snapping", Proceedings of CHI '05, 2005, pp. 301-310.

Benko, et al., "Cross-Dimensional Gestural Interaction Techniques for Hybrid Immersive Environments", Proceedings of IEEE VR '05, 2005, pp. 209-216.

Bier, et al., "Toolglass and Magic Lenses: The See-Through Interface", Proceedings of ACM SIGGRAPH '93, 1993, pp. 73-80.

Blanch, et al., "Semantic Pointing: Improving Target Acquistion with Control-Display Ratio Adaptation", Proceedings of CHI '04, 2004, pp. 519-526.

Butler, et al., "HabilisDraw DT: A Bimanual Tool-Based Direct Manipulation Drawing Environment", ACM, Proceedings of CHI '04 Extended Abstracts, 2004, pp. 1301-1304.

Buxton, et al., "A Study in Two-Handed Input", ACM, Proceedings of CHI '86, 1986, pp. 321-326.

Buxton, et al., "Issues and Techniques in Touch-Sensitive Tablet Input", ACM, Proceedings of the ACM SIGGRAPH '85, 1985, pp. 215-224.

Cutler, et al., "Two-Handed Direct Manipulation on the Responsive Workbench", ACM, Proceedings of the Symposium on Interactive 3D Graphics, 1997, pp. 107-114.

Dietz, et al., "DiamondTouch: A Multi-User Touch Technology", ACM, Proceedings of UIST '01, 1002, pp. 219-226.

Forlines, et al., "DTLens: Multi-user Tabletop Spatial Data Exploration", ACM, Proceedings of UIST '05, 2005, pp. 119-122.

Grossman, et al., "Multi-Finger Gestural Interaction with 3D Volumetric Displays", ACM, Proceedings of UIST '04, 2004, pp. 61-70.

Han, "Low-Cost Multi-Touch Sensing Through Frustrated Total Internal Reflection", ACM, Proceedings of UIST '05, 2005, pp. 115-118.

Hinckley, et al., "Two-Handed Virtual Manipulation", ACM Transactions on Computer-Human Interaction, 1998, vol. 5, No. 3, pp. 260-302.

Kabbash, et al., "Two-Handed Input in a Compound Task", ACM, Proceedings of CHI '94, 1994, pp. 417-423.

MacKenzie, et al., "A Comparison of Three Selection Techniques for Touchpads", ACM, Proceedings of CHI '98, 1998, pp. 336-343.

Malik, et al., "Interacting With Large Displays From a Distance With Vision-Tracked Multi-Finger Gestural Input", ACM, Proceedings of UIST '05, 2005, pp. 43-52.

Screen shot of "Mouse Properties", screen from Windows XP Professional.

Office action for U.S. Appl. No. 13/295,98, dated Oct. 26, 2012, Benko et al., "Precise Selection Techniques For Multi-Touch Screens ", 30 pages.

Non-Final Office Action for U.S. Appl. No. 13/295,982, dated May 3, 212, Hrvoje Benko et al., "Precise Selection Techniques for Multi-Touch Screens", 20 pages.

Office action for U.S. Appl. No. 13/295,982, dated Jun. 10, 2913, Benko et al., "Precise Selection Techniques For Multi-Touch Screens ", 23 pages.

Olwal, et al., "Rubbing the Fisheye: Precise Touch-Screen Interaction With Gestures and Fisheye Views", ACM Symposium on User Interface Software and Technology, Nov. 2-5, 2003, pp. 83-84.

Patten, et al., "Sensetable: A Wireless Object Tracking Platform for Tangible User Interfaces", ACM, In Proceedings of CHI '01, 2001, pp. 253-260.

Potter, et al., "Improving the Accuracy of Touch Screens: An Experimental Evaluation of Three Strategies", ACM, Proceedings of CHI '88, 1988, pp. 27-32.

Rekimoto, "SmartSkin: An Infrastructure for Freehand Manipulation on Interactive Surfaces", ACM, Proceedings of CHI '02, pp. 113-120.

Ren, et al., "Improving Selection Performance on Pen-Based Systems: A Study of Pen-Based Interaction for Selection Tasks", ACM Transactions on Computer Human Interaction, vol. 7, No. 3, Sep. 2000, pp. 384-416.

Sears, et al., "High Precision Touchscreens: Design Strategies and Comparisons With a Mouse", International Journal of Man-Machine Studies, 1991, vol. 43, No. 4, pp. 593-613.

Smart Technologies, Inc., Retrieved on Mar. 23, 2006 at <<http://www.smarttech.com/>>, 1 pg.

Tanaka, et al., "Finger Drawing by Infant Chimpanzees", Retrieved on May 17, 2006 at <<http://www.springerlink.com>>, 7 pgs.

Wilson, "PlayAnywhere: A Compact Interactive Tabletop Projection-Vision System", ACM, Proceedings of UIST '05, 2005, pp. 83-92.

Wilson, "Touchlight: An Imaging Touch Screen and Display for Gesture-Based Interaction", Proceedings ICMI '04, 2004, pp. 69-76.

Wu, et al., "Multi-Finger and Whole Hand Gestural Interaction Techniques for Multi-User Tabletop Displays", ACM, Proceedings of UIST '03, 2003, pp. 193-202.

\* cited by examiner

GRAPHICAL INDICATIONS OF RELATIVE SPEED REDUCTIONS

PRECISE SELECTION TECHNIQUES FOR MULTI-TOUCH SCREENS

RELATED APPLICATION

This application is a continuation of and claims priority to U.S. patent application Ser. No. 13/295,982, filed on Nov. 14, 2011, titled "Precise Selection Techniques for Multi-Touch Screens", which is a continuation of and claims priority to U.S. patent application Ser. No. 11/379,297, filed on Apr. 19, 2006, titled "Precise Selection Techniques for Multi-Touch Screens," both of which are incorporated by reference herein in their entirety.

BACKGROUND

In general, touch screen technology has advanced in recent years. The ability to directly touch and manipulate data on the screen without using any intermediary devices has a very strong appeal to users. In particular, novices tend to benefit most from the directness of touch screen displays. A fast learning curve and inherent robustness (no movable parts) make touch screens an ideal interface for interacting with public installations, such as information kiosks, automated teller machines, ticketing machines, retail cashier systems for employee or customer use, voting machines, or gambling devices.

While touch screen use has become widespread in such special purpose applications, its presence in more general computing devices such as personal computers and laptops, for example, is far less prevalent. The slow adoption of touch screens into more general computing devices may be attributed to known issues of relatively high error rates and arm fatigue. In addition, the variable size of human fingers and the lack of sensing precision can make touch screen interactions difficult at best.

Due to technical restrictions, most commercially available touch screen devices currently in use are only capable of tracking a single point on the surface of the device. However, multi-touch devices are slowly emerging into the marketplace. Unfortunately, the multi-touch screens introduce further challenges in addition to those currently existing in single-touch screens. For instance, the underlying technology of multi-touch sensitive devices often makes their input noisier, thus requiring further considerations for filtering the undesirable noise and/or distinguishing the correct input from the noise.

These issues become especially problematic when running program applications developed for a traditional mouse interface on a multi-user touch screen. This is primarily because current WIMP (windows, icons, menus, and pointing) user interfaces require frequent selection of very small targets (e.g., about 4 pixels or less). For example, window resize handles are often just 4 pixels wide. Noisy input, lower tracking resolution, and a large potential touch area of a finger tend to create significant selection problems.

Furthermore, fingertips can occlude small targets depriving users of visual feedback during target acquisition. The user's hands and arms may contribute to the occlusion problem. Depending on screen orientation, the user may be forced to either look "under hand" (with horizontally positioned screens) or "over hand" (with angled or vertically positioned screens). Finally, it is often difficult to decide the optimal point in the finger's contact area which should anchor the cursor, leaving the usual choice to the center of mass. This can lead to a small but pervasive disconnect between the user's expectations regarding cursor position and what is actually being sensed and computed. These issues have been recognized by researchers who have proposed several solutions: adding a fixed cursor offset, enlarging the target area, and providing on-screen widgets to aid in selection. However, these solutions tend to fall short either by introducing new problems or by only improving some problems and leaving others unresolved. For example, the fixed cursor offset provides a cursor with a fixed offset above the tip of a finger when the user is touching the screen. Lifting the finger off the screen triggers a selection ("click"). While this method is effective for most targets sizes, it has been found ineffective when the target size is smaller than 4 pixels. In addition, the risk or frequency of unintentional clicks may still be undesirably high.

Others have explored cursor stabilization improvements that effectively slow down the cursor movement in various regions around the initial finger contact point. While this method performed well for the target acquisition task, precise steering tasks, such as drawing, would be hard due to varying cursor speed. More recently, several on-screen widgets have been explored for increasing precision while selecting small targets on a touch screen. However, their interactions were designed to be used with touch screens capable of reporting only a single contact point and therefore the users were required to execute multiple discrete steps before selecting the target. These steps were delimited by the user lifting their finger from the screen, thus impeding the overall interaction performance. Losing overview or context is another main drawback of this technique which can cause significant problems in many applications.

Increasing the relative size of screen targets has also been explored by scaling the display space or scaling the motor space. This work experimented with hand gestures that activated various levels of fish-eye distortion in the interface to facilitate target selection. Techniques that adaptively increase the motor space while leaving the displayed image unchanged show promising results without introducing screen distortions, but require that the system know all target locations. This information might not be available in many of today's applications. More importantly, such techniques require the use of a relative pointing device such as a mouse. Without such devices, they introduce an unpredictable cursor offset when applied directly to an absolute pointing device such as a touch screen.

Research in the area or multi-touch screens has identified that most current user interfaces require an interaction model consisting of at least 3 different states: out-of-range, tracking, and dragging. However, many touch sensitive devices can only reliably sense location in one state thus making it hard to disambiguate between dragging and tracking (hover). The use of a stylus (pen) is generally preferred in many interfaces that require precise interactions. However, while a stylus has a much smaller tip, the associated issues with hand tremor and resolution make the selection task of small targets more difficult than with a mouse.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that facilitate pixel-accurate targeting with respect to multi-touch sensitive displays when selecting or viewing content with a cursor. More specifically, target areas for selection, navigation or other manipulation can be pin-pointed with greater precision and accuracy such as by magnifying the target area, adjusting the speed of the cursor, and/or using various gestures to adjust the position of the cursor. Thus, both cursor steering and selection of an assistance mode (e.g., cursor offset, scale, speed, or a combination) can be performed at or about the same time as desired by the user. This can be accomplished in part by employing dual member (or finger) selection operations. In particular, dual finger operations involve tracking multi-touch input, or rather input received from a primary finger and a secondary finger. For example, the primary finger can be used to control the movement of the cursor while a secondary finger can adjust the control-display ratio. Thus, the secondary (e.g., non-pointing) finger can quickly modify or switch cursor manipulation modes without disrupting the primary (e.g., pointing) finger. Once the precise target selection area is in clear view as desired by the user, the primary finger can make the selection.

In practice, for instance, placement of the secondary finger on the surface can trigger a number of different events that affect the cursor. The events can be distinguished by various user or screen settings or by detecting certain movements made by the secondary finger. For example, placing the secondary finger anywhere on the surface of the screen can cause an offset of the cursor from its original position. In this scenario, either the primary or secondary fingers or both can be used to guide the cursor to its intended target on the screen. Sliding movements made by the secondary finger relative to the primary finger can reduce or increase the speed of the cursor depending on the direction of the slide. The amount of the reduction can depend on the distance of the slide. Furthermore, the secondary finger can trigger a menu to appear on-screen, whereby the user can choose an option therefrom (using the secondary finger) to alter the cursor's speed, position, or offset.

Moreover, the secondary finger can adjust the control-display ratio of the screen while the primary finger controls the steering to improve target selection and cursor navigation. That is, the primary and secondary fingers can operate concurrently to provide a fluid and natural interaction between the user and the content displayed on the multi-touch screen.

Once the cursor is positioned over the desired target, a "click" or selection of the target can be accomplished by using the primary finger. More specifically, the system and method provide for cursor stabilization in order to mitigate unintentional clicks and selection errors. Unlike conventional clicking techniques, the cursor position can be mapped to correspond to a top middle point of the primary finger's contact area rather than to the center of the contact area or finger mass. Using a rocking motion from fingertip to wrist, the primary finger can move in this downward manner to signal a click of the underlying content. As a result, more accurate clicks can be performed in a relatively efficient manner.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

Figure 1:
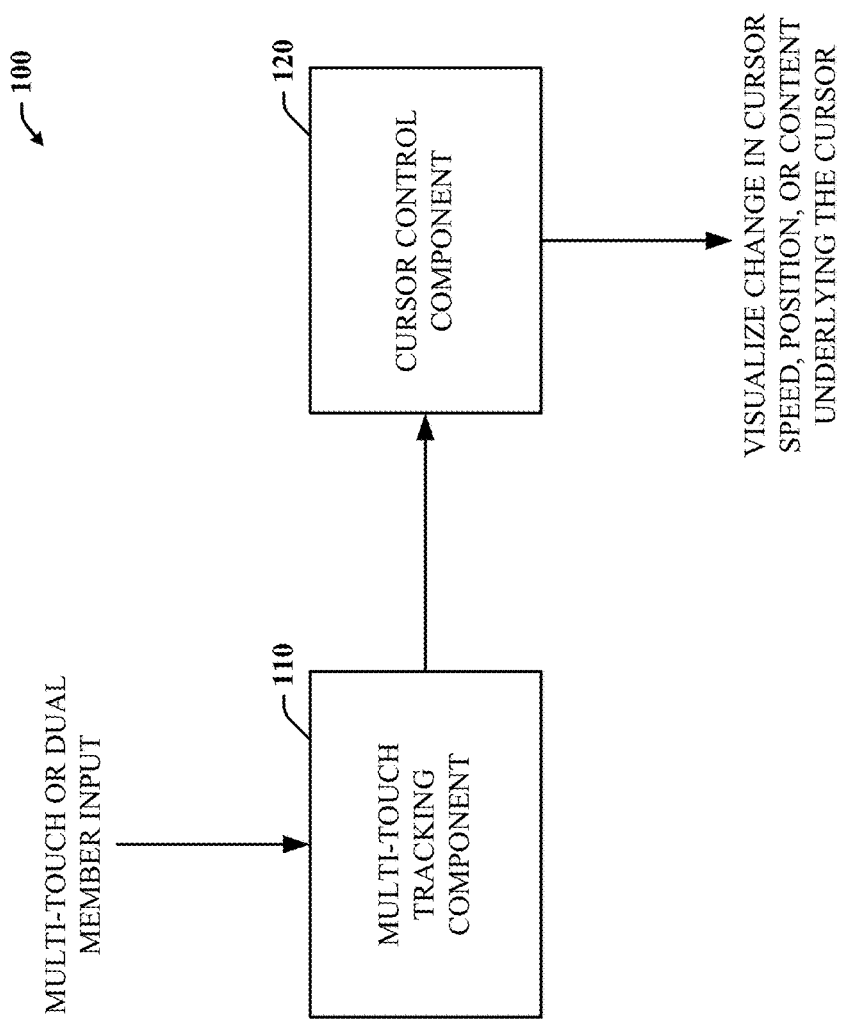
FIG. 1 is a block diagram of a system that facilitates pixel-accurate targeting with respect to multi-touch sensitive displays when selecting or viewing content with a cursor.

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Current operating systems and program applications such as for word processing, spreadsheets, slide show presentations, drawings, messaging, and calendaring require a high amount of precision for navigation and selection. This is largely due to the fact that when using a touch screen, operating systems and many of these general computing applications have a lot of noise in tracking which can affect selection precision. As screen resolution increases, selection and navigation precision naturally increases as well. Although screen resolution for multi-touch screens has improved somewhat in recent years, selection and navigation precision has not followed to the degree demanded by many of these WIMP based applications and operating systems. The subject application as described in more detail with respect to FIGS. 1-15, infra, provide various techniques to enhance the user's experience with a multi-touch screen by allowing the user to modify the control-display ratio when desired (e.g., temporarily) to assist in targeting and to reduce tracking noise while still moving and steering the cursor.

It should be appreciated that the term dual finger as used throughout the application refers to the use of any two digits or members including those on a user's hand, hands, foot, or feet and is not meant to be limited to only the user's fingers. For purposes of brevity throughout the discussion below, the term primary can refer to the first touch or finger on the surface while the term secondary can refer to the second touch or finger detected on the surface. This is based on the presumption that in general use, the user initially points the cursor to the desired area on the screen and then desires some assistance with moving or selecting content with the cursor. For example, the primary finger can refer to the finger that the user normally points with which tends to be the index finger on the dominant hand. The secondary finger can refer to a helper finger which can be any other finger on the same or opposite hand. Thus, the terms primary and first and secondary and second, respectively, may be used interchangeably. With some interactions, a single-handed operation is desired. In such cases, the thumb of the dominant hand can serve as a secondary finger.

Referring now to FIG. 1, there is a general block diagram of a system 100 that facilitates pixel-accurate targeting with respect to multi-touch sensitive displays when selecting or viewing content with a cursor. The system 100 includes a multi-touch tracking component 110 that can track bi-manual or dual finger input. Bi-manual input can be provided by the use of both hands whereas dual finger input can be provided from the same hand or through the use of both hands. In particular, the tracking component 110 can detect and disambiguate between a primary and a secondary finger touch, thereby facilitating cursor steering (by the primary finger) concurrently with the selection of an assistance mode (by the secondary finger). By tracking such input from each finger, a cursor control component 120 can regulate the speed or position of the cursor as well as the scale of the content underlying the cursor based on the respective inputs. For example, particular movements made by the secondary finger or the presence of the secondary finger on the surface can trigger the cursor control component 120 to automatically adjust the speed or position of the cursor or the control-display ratio of at least a portion of the content on the screen.

When the secondary finger is removed from the surface, the contact is broken which can cause the cursor to return to its previous or default state. Hence, the modifications to the cursor and/or to the control-display ratio can be temporarily invoked by the user on an as-needed basis. By controlling the cursor in this manner, the user can receive assistance in targeting or in reducing tracking noise when explicitly requested. Conventional techniques require users to continuously compensate their targeting even when the target is large enough to be easily selected by direct touch, which can hinder overall maneuverability and unduly complicate otherwise effortless direct touch interactions.

Figure 2:
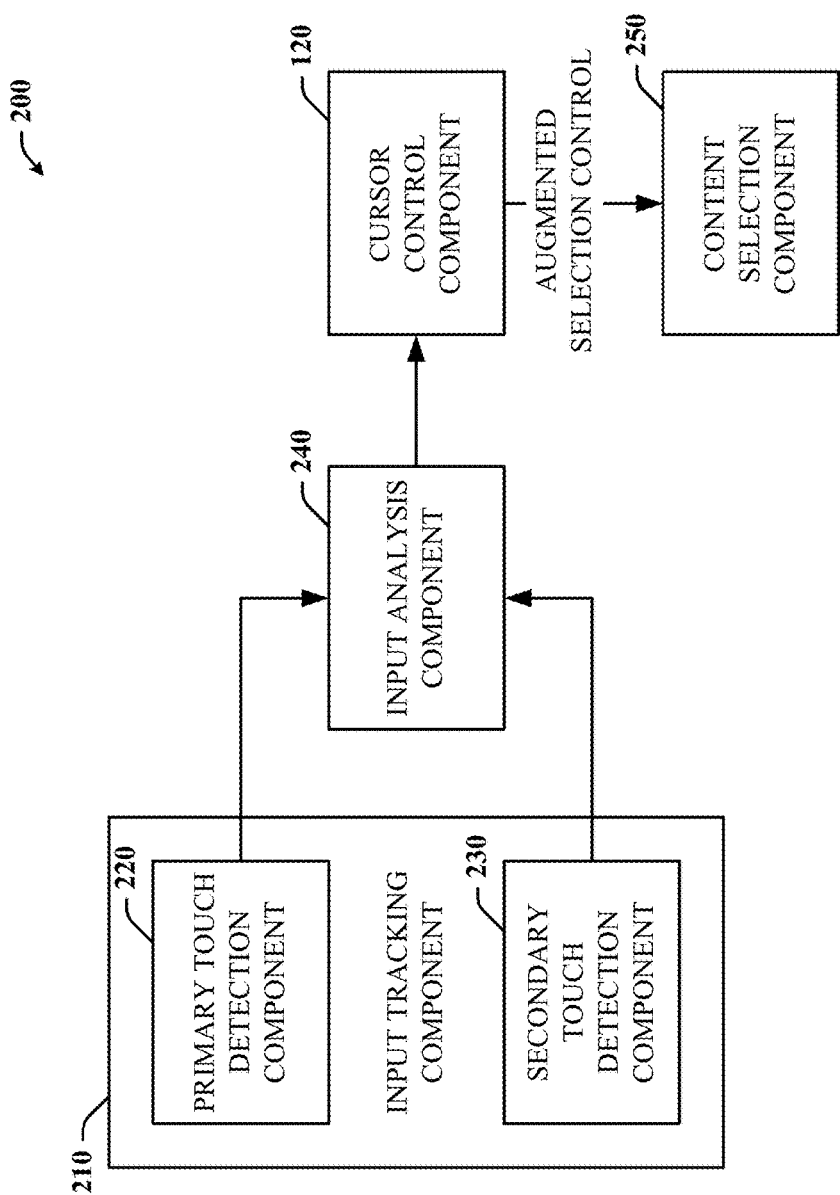
FIG. 2 is a block diagram of a system that facilitates pixel-accurate targeting with respect to multi-touch sensitive displays that involves receiving and processing dual member touch input in order to make cursor selection more precise.

Turning now to FIG. 2, there is a block diagram of a system 200 that facilitates pixel-accurate targeting with respect to multi-touch sensitive displays that involves receiving and processing dual finger touch input in order to make cursor selection more precise. The system 200 includes an input tracking component 210 that can track and disambiguate the touch input of at least two fingers. In particular, the input tracking component 210 includes a primary touch detection component 220 and a secondary touch detection component 230. The primary touch detection component 220 can sense when contact is made on the surface of the screen by a first finger and track its movement or action until such contact is broken (e.g., finger is lifted off or removed from the surface). Similarly, the secondary touch detection component 230 can sense a second touch made by another finger, for example.

The input from each detection component can be communicated to an input analysis component 240 for processing. The input analysis component 240 can examine the touch input as it is sensed by the respective detection component. The cursor control component 120 can take such analysis and modify at least one of speed, position, or scale of the cursor according to the input, thereby facilitating the selection of desired content. A selection component 250 can then "click" the desired content.

The detection of the second touch or second finger on the surface can trigger a variety of events to occur which can temporarily affect the cursor's position, speed, and/or scale. In practice, for example, imagine the user is using a multi-touch screen to view a message. Each message (e.g., in a list of messages) may be a large enough target to accurately hit without assistance; thus, the user can readily put his pointer finger down onto the screen and select the desired message to open. Once opened, the user may want to minimize the window for a few moments while he views some other content. The "minimize" button can be characterized as a smaller target (e.g., about 4 pixels or less) that requires greater precision during selection. In some operating systems, it can be located next to other window operations such as resize or close. Hence, less than accurate targeting of the intended button can lead to an undesirable result and can be costly to the user.

Figure 4:
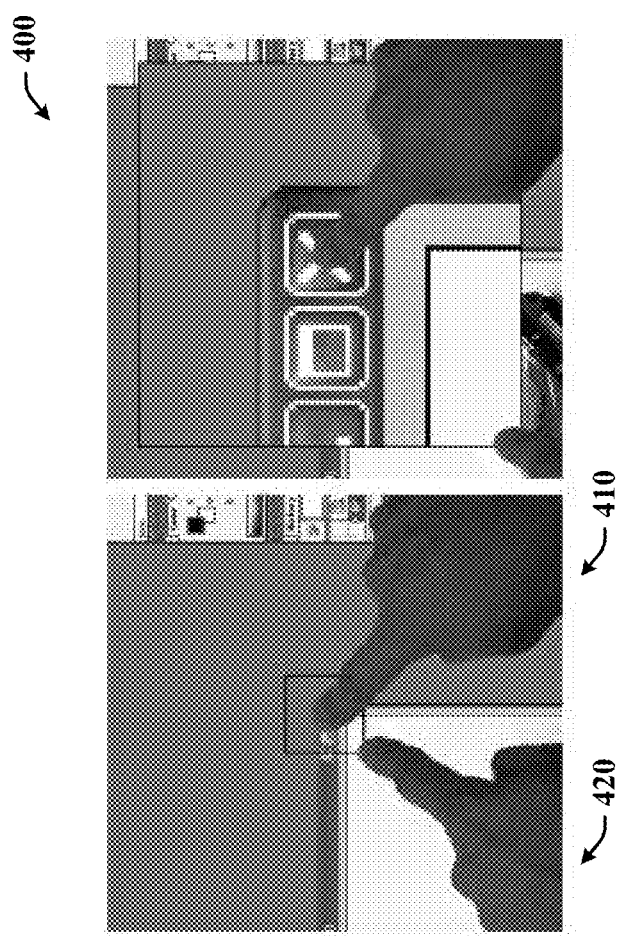
FIG. 4 is a diagram that demonstrates another example of dual member touch input whereby the secondary finger can stretch and enlarge an area surrounding the current cursor position (first finger) to facilitate selecting smaller targets with greater precision and accuracy.

To select the "minimize" button, the user can place a first or primary finger over or on the minimize button. The first touch detection component 220 senses this touch and the cursor moves or jumps to this position. To obtain a better or larger view of the target area, the user can place a secondary finger on the screen to the left or right and above or below the primary finger. The actual placement of the secondary finger can depend on the relative location of the primary finger. Following, the secondary finger can be dragged away from the primary finger at an angle. The second touch detection component 230 can track this movement and automatically invoke a scaled magnification of a squared area surrounding (e.g., centered around) the location of the primary finger. The initial placement of the secondary finger can identify the squared area which is to be scaled. Such movements by the secondary finger can be processed by the input analysis component 240 and communicated to the cursor control component 120 in order to visualize the change in the control-display ratio in this part of the screen. Hence, the user can adaptively scale a portion of the screen with the secondary finger to assist in selection precision and accuracy while still employing the primary finger to perform the actual selection. FIG. 4, infra, further illustrates this selection operation.

Figure 3:
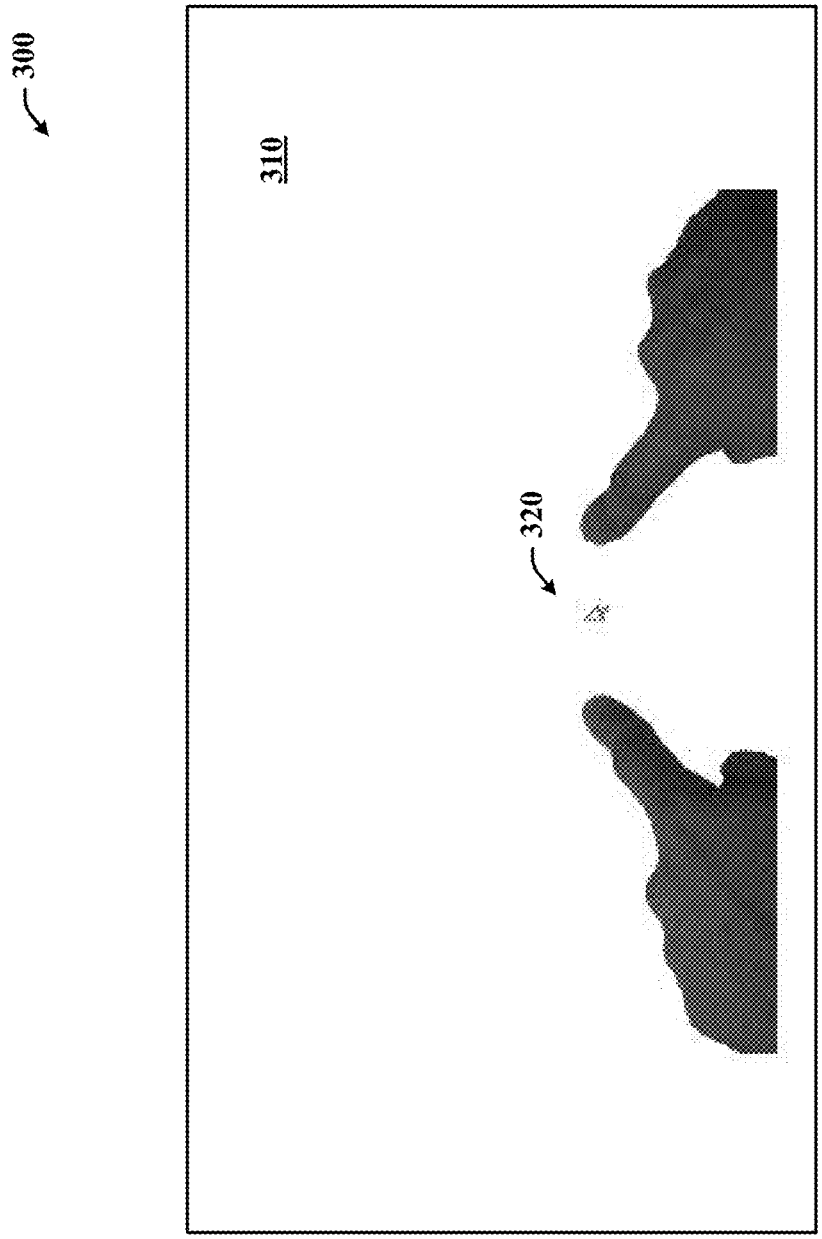
FIG. 3 is a diagram that demonstrates one example of dual member touch input whereby the secondary finger triggers a change or amount of offset of the cursor from its original position.

Several of the following figures demonstrate alternative approaches to enhancing pixel-accurate targeting. Referring now to FIG. 3, there is a diagram 300 that demonstrates one example of dual finger touch input whereby the secondary finger triggers a change in cursor position from its original position. To provide both variable offset and enable finer control of the cursor speed, this technique can be triggered by placing the secondary finger on the surface 310. The cursor 320 is then offset to the midpoint between the primary and the secondary fingers. While both fingers are in contact with the screen, moving either or both fingers controls the movement of the cursor. However, clicking can still performed only by the primary finger.

This technique allows for variable reductions in cursor speed: when both fingers are moving in the same direction and the same speed, the cursor follows with the same speed; while when only one finger is moving, the cursor moves with half the speed of that finger. This method can effectively reduce the finger speed by a factor of 2 which yields good results for most targets; but it may not provide enough control for the smallest targets (e.g., 2 pixels or less). An additional shortcoming of this technique is that not all locations on the screen are equally accessible. For example, screen corners are not accessible using midpoint selection.

Generally speaking, the cursor offset is not enabled by default. However, by placing a secondary finger anywhere on the surface 310, the cursor is subsequently offset with respect to the primary finger by a predefined fixed amount. This offset can be programmed to always place the cursor above the primary finger. Other positions can be chosen as well. To accommodate both left- and right-handed users, the cursor can be placed to the left or to the right of the primary finger based on the relative position of the secondary finger. For example, by placing the secondary finger to the left of the secondary finger to the left of the primary, the cursor appears to the left of and above the primary finger.

Turning now to FIG. 4, there is a diagram 400 that demonstrates another example of dual member touch input whereby the secondary finger can stretch and enlarge an area surrounding the current cursor position (primary finger location) to facilitate selecting smaller targets with greater precision and accuracy. As discussed earlier, this stretching technique allows the user to adaptively scale a portion of the screen with the secondary finger while the primary finger performs the selection. To allow for simultaneous or concurrent "stretching" and selection, the primary finger 410 provides the initial anchor location around which the user interface is scaled, while the secondary finger 420 identifies the corner of the square area which will be scaled. In particular, the secondary finger specifies the square zooming area centered at the primary finger's location. By moving the secondary finger 420 closer or further away from the primary 410 finger, the square stretching area is reduced or expanded as illustrated in FIG. 4. Lifting the secondary finger 420 from the table resets the interface to its default un-stretched state. Upon this reset, the cursor is offset with respect to the primary finger 410 and is placed where it was located in the stretched state. The cursor offset can be reset when all fingers are removed from the table.

The extent of control-display ratio manipulation depends on two physical limits: the closest perceptible distance between the user's fingers and the largest diagonal of the screen. For most common mid-screen manipulations, this stretch technique can enable control-display ratios roughly up to 10. By allowing clutching and repeated zooming, it can be possible to further increase this ratio.

Furthermore, this technique has several advantages over conventional techniques primarily due to the dual finger design. In such conventional strategies, zooming and selection are decoupled into two separate actions, whereas here, they can happen concurrently which results in a fluid interaction. In addition, the subject interface scales in all directions from the primary finger's original location. This provides an important advantage over traditional rectangle selection where the two points specify the diagonal corners of the zooming rectangle (also known as bounding box zoom).

With traditional rectangle selection, the user tends to place the primary finger off target in order to capture the target in the zoomed area; while with the subject technique, the user can place the primary finger 410 directly on the target and the interface scales underneath in all directions (as shown in FIG. 4). Placing the finger off-target as is done conventionally requires the user's primary finger to traverse an increased distance to perform final selection because the target will appear to move away from the finger as the zoom level increases. By encouraging placement of the primary finger as close to the target as possible as is done herein, the eventual distance that this finger will need to traverse to acquire the target is minimized.

Figure 5:
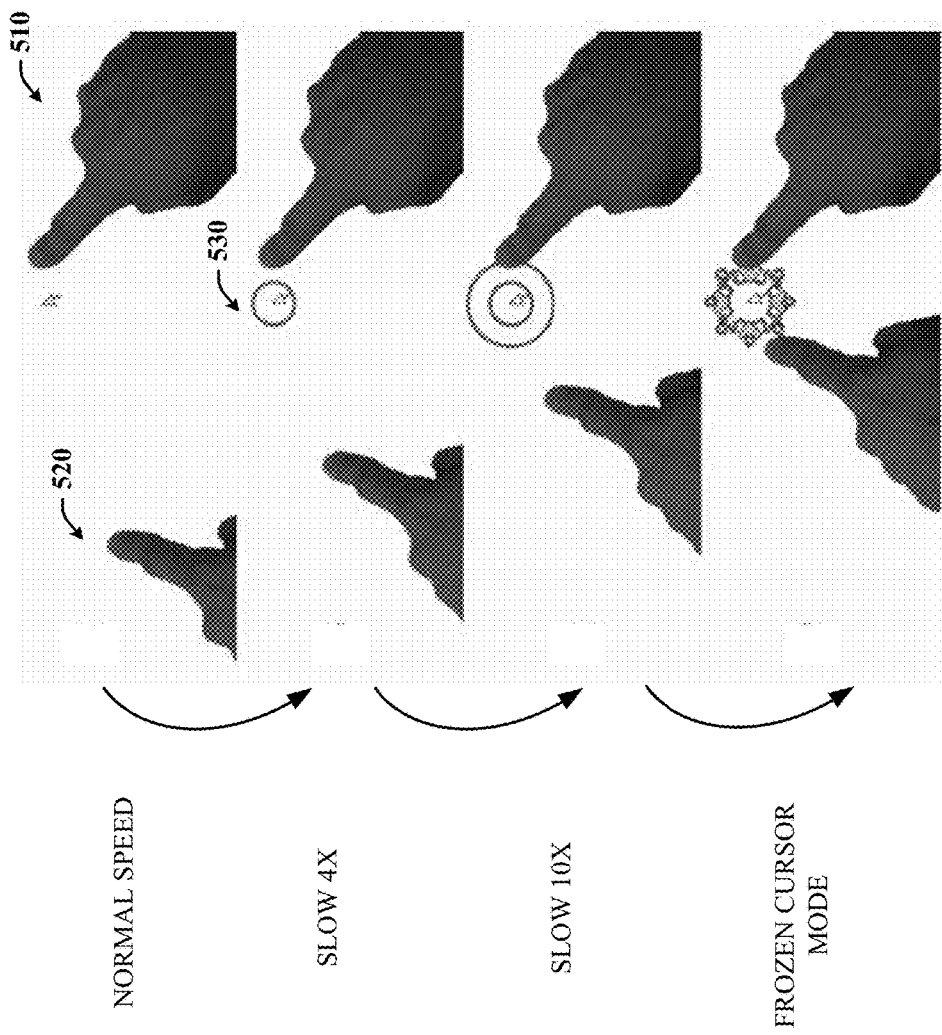
FIG. 5 is a diagram that demonstrates another example of dual member touch input whereby a sliding movement by the secondary finger can alter the cursor speed upward or downward depending on the direction of the slide.

FIG. 5 is a diagram that demonstrates another example of dual member touch input whereby a sliding movement by a secondary finger can alter the cursor speed upward or downward depending on the direction of the slide. Given that two-finger interactions are a very natural way of specifying distance, this interaction uses the distance between fingers to switch between cursor speed reduction modes. This technique does not present an on-screen graphic to the user. Instead, it relies on the user's ability to gauge the spatial relationship between their fingers.

As illustrated in this exemplary scenario, the right finger (primary) 510 controls the cursor and the left finger (secondary) 520 is invoking this invisible slider control. A cursor notification graphic 530 can be used to signal the cursor speed to the user (see FIG. 6, infra). Moving the secondary finger 520 towards the primary finger 510 reduces the cursor speed in 3 discrete steps. This allows for the same reductions in cursor speed: normal, slow 4×, slow 10×, and freeze (frozen cursor mode). Moving the secondary finger 520 away from the primary 510 increases the speed up to the normal speed. The distance that the secondary finger traverses in switching speed reduction modes can be predefined and is not necessarily dependent on the distance between the fingers.

Continuing to move the fingers apart triggers a "snap" which brings the cursor back to the primary finger's location. Snapping can be signaled by a distinct sound effect to assist the user in recognizing what has occurred. Furthermore, the modes can be remembered even after the user lifts the secondary finger which allows for clutching in the interaction.

Figure 6:
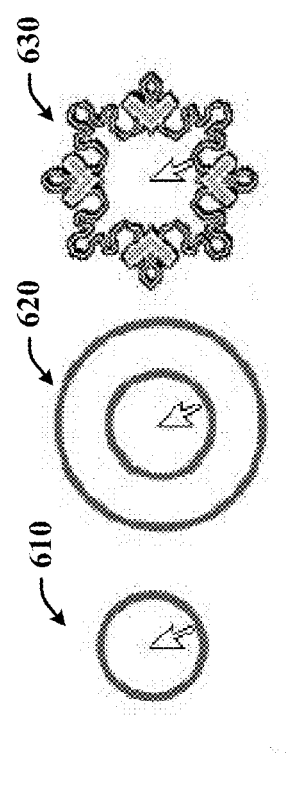
FIG. 6 is a diagram that demonstrates cursor notification graphics that can be employed to indicate the current speed of the cursor (e.g., 4× slower speed (left) to a 10× slower speed (middle) and then to a frozen state (right)).

In FIG. 6, there is a diagram that demonstrates cursor notification graphics that can be employed to indicate the current speed reduction of the cursor. For example, the speed of the cursor can be reduced by a factor of J (610), where J is an integer greater than 0, by a factor greater than J (620), or can be frozen in place (630), thereby disabling any cursor movement. The ability to completely stop the cursor from moving has at least two benefits. First, by freezing the cursor, the user can quickly and easily establish a desired cursor offset. This can be accomplished by freezing the cursor temporarily, moving the finger to achieve the desired offset, and then unfreezing the cursor again. Second, when selecting very small targets, even small amounts of noise can cause an error. Such noise can be due to device tracking errors, tremor in the user's hand, or noise due to the clicking motion. By freezing the cursor in place, the user can ensure that the desired selection is successful even in very noisy conditions. Moreover, it should be appreciated that other speed reductions can by employed as well in addition to or as alternatives to these.

Figure 7:
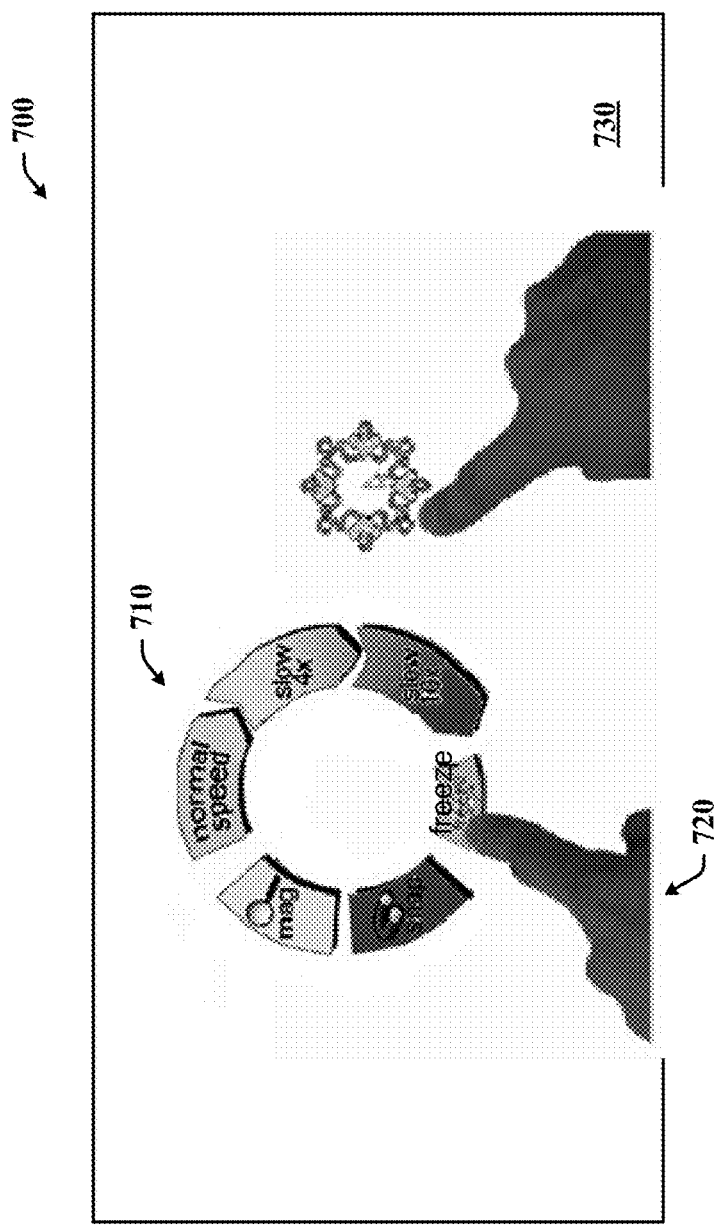
FIG. 7 is a diagram that demonstrates another example of dual member touch input whereby a secondary finger triggers the appearance of a menu from which an option can be selected in order to adjust the position or speed of the cursor.
Figure 8:
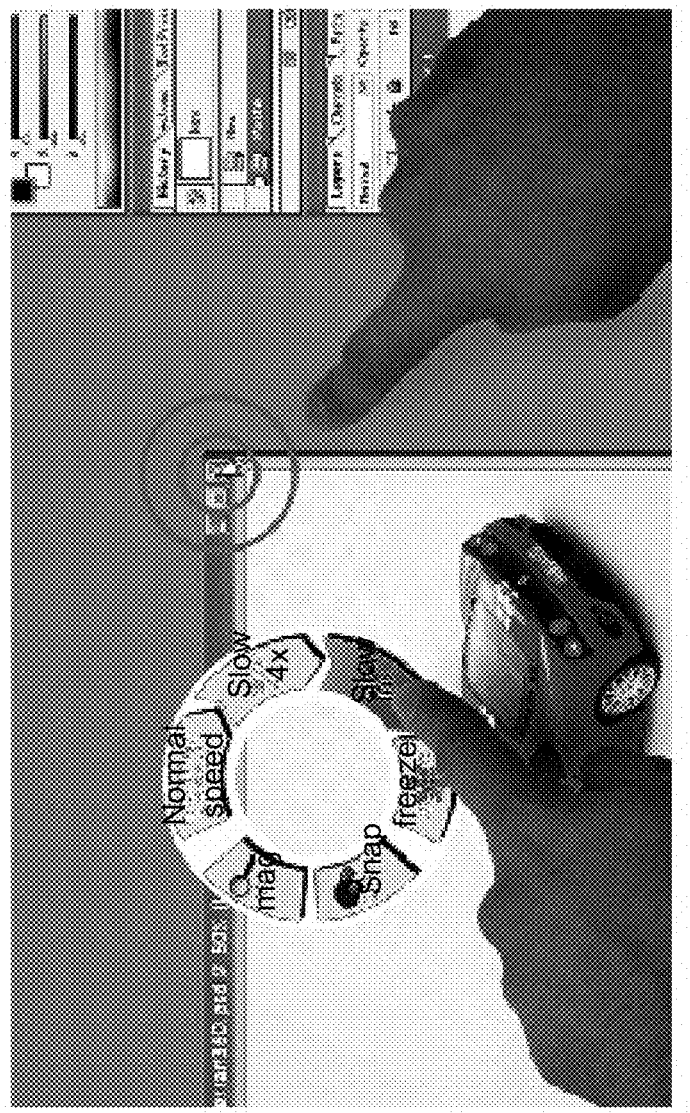
FIG. 8 is a diagram that demonstrates an exemplary user interface of a cursor modification menu that has been triggered by a secondary finger in order to alter the current cursor state.

Turning now to FIG. 7, there is a diagram 700 that demonstrates another example of dual member touch input that allows users to adaptively adjust the control-display ratio as well as obtain cursor offset while looking at an un-zoomed user interface. More specifically, a menu 710 (e.g., circular menu) can be invoked whenever the secondary finger 720 establishes contact with the surface 730. The menu 710 can be positioned so that the finger 720 is located at its center. The user can select a particular assistance mode by moving the secondary finger 720 to any of the desired regions of the menu. FIG. 8 provides an illustration of the menu as it can be employed in practice. As shown in this figure, the user desires to select a "close window" button. To increase the accuracy of the button selection, the user can trigger the menu to appear on-screen and then can select a speed reduction level from the menu to slow down the speed of the cursor. As a result, the user can move the cursor over the intended target with substantially more precision and click on the button with far greater accuracy.

Figure 9:
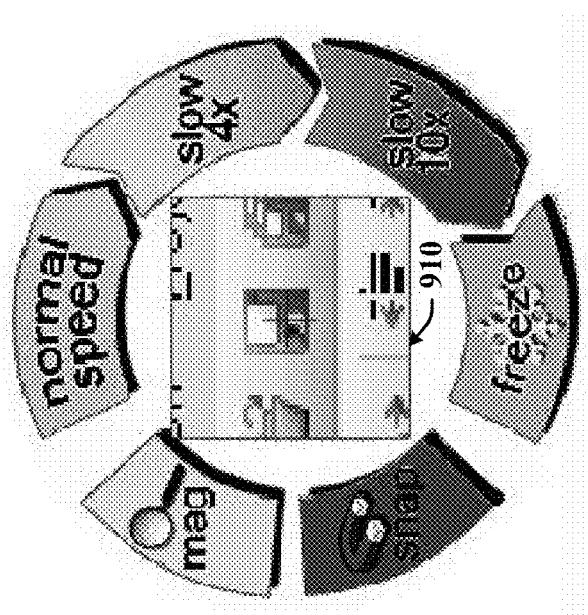
FIG. 9 is a diagram of an exemplary cursor modification menu including 6 selection areas.

The menu can have six selection areas as shown in FIGS. 7, 8, and 9. Four areas can control the relative speed of the cursor: normal, slow 4×, slow 10×, and freeze. Normal mode moves the cursor with the same speed as the primary finger; the two slow modes reduce the speed of the cursor by a factor of 4 and 10 respectively, while freeze mode "freezes" the cursor in place. The left two areas on the menu can invoke two helper modes such as "snap" and "magnify". When snap mode is triggered, the cursor offset (if any) is removed, and the cursor snaps back to the current location of the primary finger. This mode is useful in repositioning the cursor in the slow movement modes because it is easy to run out of tracked screen space when using the slow cursor modes.

Magnify mode presents a small magnification area in the middle of the menu that shows the enlarged area under the cursor (see FIG. 9, 910). The magnification factor can be fixed at 2×, for instance. This mode is particularly useful when the primary finger overlaps the cursor. In this case, the magnified image acts as a lens showing the portion of the interface obstructed by the primary finger. As noted earlier, a cursor notification graphic can signal which cursor speed reduction level is currently selected, without requiring the user to refer back to the menu. It should be appreciated that the menu can include any number of selection areas as desired by the system programmer or the user.

Unlike conventional menus, this particular menu does not operate by clicking to make a selection but rather by crossing the finger into a particular selection area, which enables more experienced users to activate modes by performing quick strokes in a particular direction. With practice, this selection can be made without looking, and could therefore allow for an expert mode in which the menu could be completely hidden from or made more transparent to the user. Removing the secondary finger from the surface can cause the menu to disappear.

Once the cursor is placed over or on the intended and desired target, the user can select the target using the primary finger. Because the act of selecting a target can be noisy due to such factors as tracking errors, hand tremors, or unintentional movements or flinches, conventional clicking operations tend to be ineffective. For example, such conventional clicking operations typically perform a click when the contact between the user's finger and the surface is either established or broken. These techniques provide a mechanism for clicking but do not accommodate the needs of current user interfaces that require at least 3 different interaction states: out of range, tracking or hovering, and dragging. Both tracking and dragging states require the contact position to be continuously reported; however, most current touch-sensitive devices only sense location when the contact is actually touching the surface, making it difficult to approximate those two states. A possible solution is to use pressure-sensing technology and map the increased pressure to a dragging state, and light pressure to a tracking state.

Figure 10:
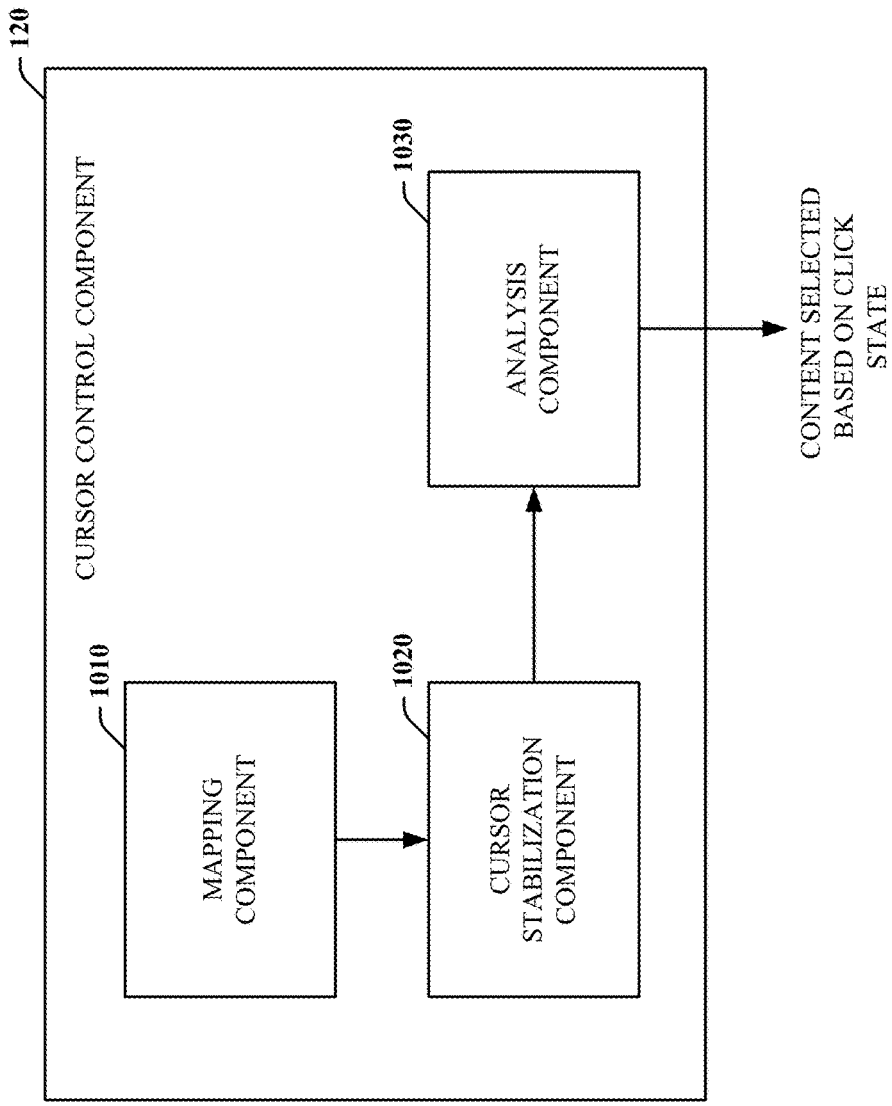
FIG. 10 is a block diagram of a system that facilitates selecting or clicking on objects while mitigating unintentional clicks and reducing cursor noise during selection.
Figure 11:
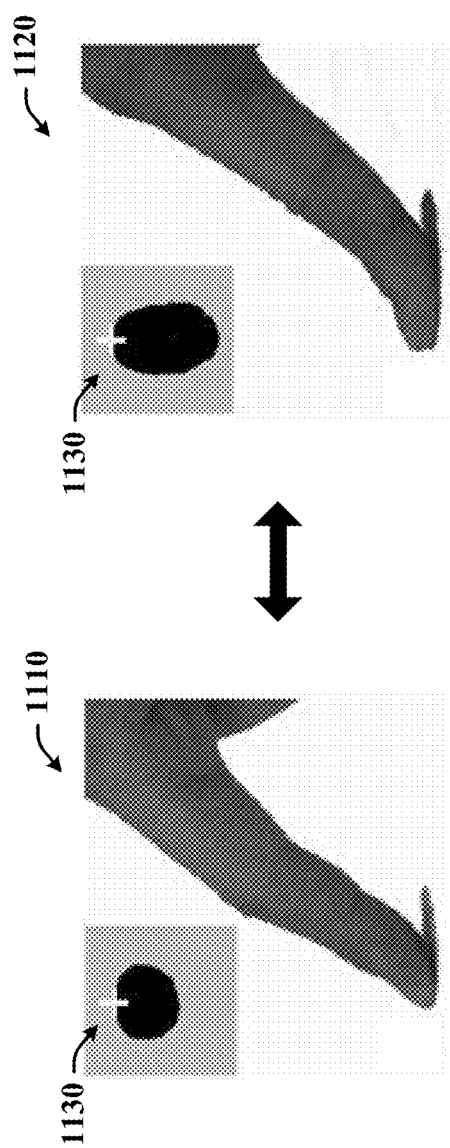
FIG. 11 is a diagram that schematically illustrates the system of FIG. 10 as it may be employed.

FIG. 10 illustrates a block diagram of a cursor control component 120 that facilitates selecting or clicking on objects while mitigating unintentional clicks and reducing cursor noise during selection. The cursor control component 120 does not report pressure directly; however a pressure-sensitive device can be simulated by employing a mapping component 1010 to map the changes in a finger's contact area to the changes in pressure. Though applying different finger areas to different pressure states has been performed in conventional devices, the cursor control component 120 can reduce cursor noise while the user is changing or transitioning between pressure states (clicking). This can be accomplished in part by stabilizing the cursor movement during clicking via a cursor stabilization component 1020. In order to effectively stabilize the cursor during clicking, the user applies a small rocking motion with their finger in order to perform a "click", as demonstrated in FIG. 11. Since the user starts pointing with their finger tip (FIG. 11, 1110) and then rocks the finger to click (1120), the increase in area happens predominately in one direction: from the tip point towards the user's wrist. As a result, the cursor position (1130) can be stabilized by fixing the cursor location (1130) to the top middle point of the contact area, rather than to the center of mass as has been done in traditional clicking techniques.

Preliminary experiments have indicated that this point naturally moves much less than the center point and therefore reduces the cursor noise during clicking. By fixing the cursor to the top-middle point, the user is also able to make a more drastic change in the contact area without significantly disturbing the cursor location, which aids in reduction of the unintentional clicks. Two thresholds on contact area can be established to disable spurious switching between the clicking states due to noise or hand tremor. An analysis component 1030 (FIG. 10) can be employed to determine whether the threshold levels have been satisfied or crossed.

Crossing the high threshold activates the click-on state, and crossing the low threshold returns back to a click-off state. Due to finger size differences, these high and low thresholds can be automatically or manually calibrated for each user. In addition, the orientation of the hand and arm can and should be considered since the top-middle point of the user's finger will not appear as such if the user contacts the surface from more than one direction (e.g., straight ahead, from the side, upside-down, etc).

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 12:
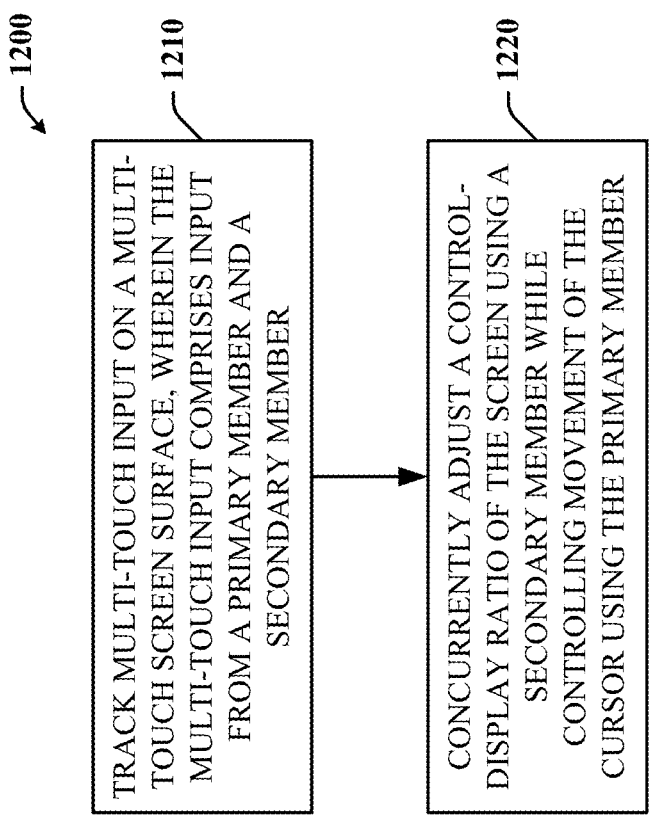
FIG. 12 is a flow diagram illustrating an exemplary methodology that facilitates pixel-accurate targeting with respect to multi-touch sensitive displays when selecting or viewing content with a cursor.

Referring now to FIG. 12, there is a flow diagram illustrating an exemplary method 1200 that facilitates pixel-accurate targeting with respect to multi-touch sensitive displays when selecting or viewing content with a cursor. The method involves tracking multi-touch input at 1210. The multi-touch input can include input from a primary finger (or member) and a secondary finger (or member). At 1220, the control-display ratio can be adjusted by the secondary finger while the primary finger controls the movement of the cursor. Thus, these two inputs can be performed and/or received concurrently or overlapping with respect to one another. Therefore, the cursor can be moved or steered to a desired location while at the same time modifying the type assistance employed to move or steer the cursor.

Figure 13:
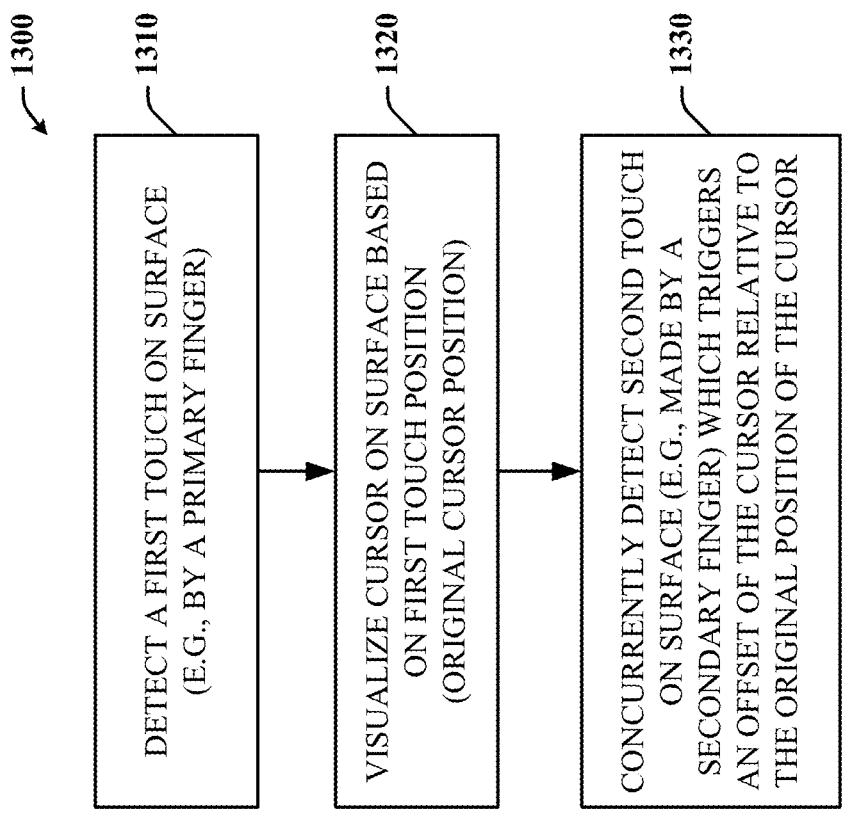
FIG. 13 is a flow diagram illustrating an exemplary methodology that facilitates pixel-accurate targeting with respect to multi-touch sensitive displays based in part on dual member touch input when selecting or viewing content with a cursor.
Figure 14:
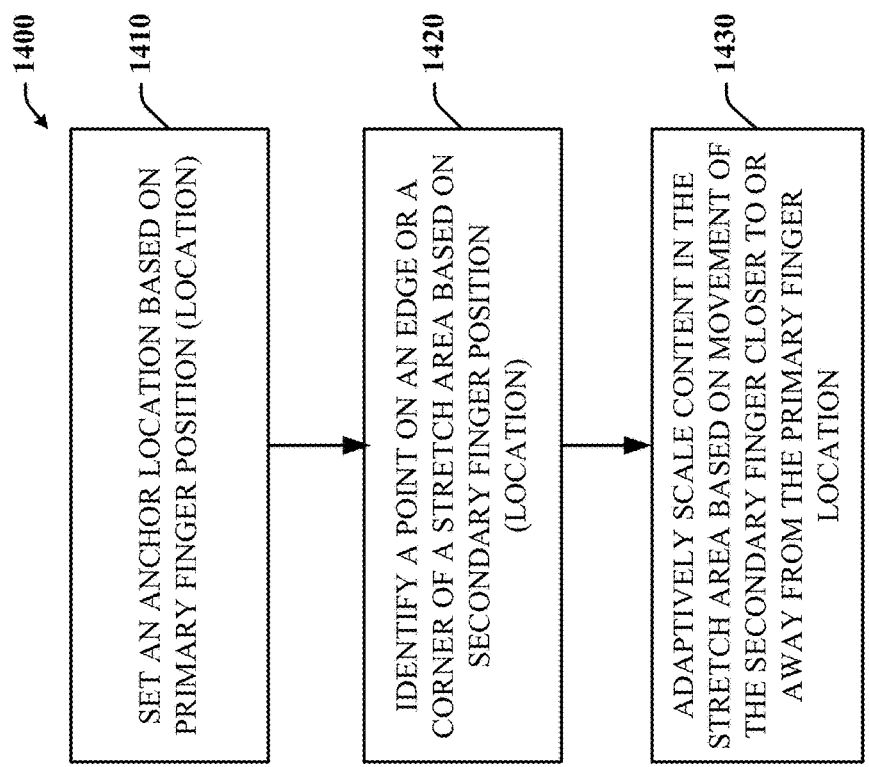
FIG. 14 is a flow diagram illustrating an exemplary methodology that facilitates enhancing cursor selection of smaller targets whereby the secondary finger (member) can stretch and enlarge an area surrounding the current cursor position (held by the primary finger).
Figure 15:
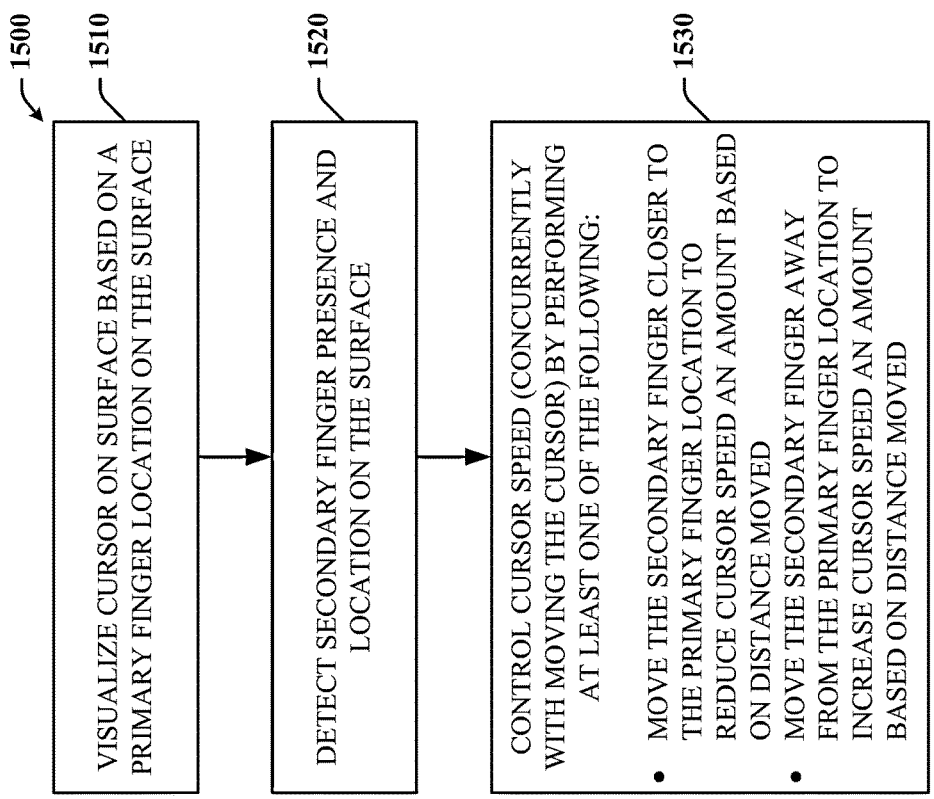
FIG. 15 is a flow diagram illustrating an exemplary methodology that facilitates enhancing cursor selection of smaller targets whereby a sliding movement by the secondary finger can alter the cursor speed upward or downward depending on the direction of the slide.

FIGS. 13-15 present specific methods that can be employed to facilitate pixel-accurate targeting. For example, the exemplary method 1300 in FIG. 13 involves detecting a primary or first touch on the surface at 1310. Thereafter, the cursor can be visualized at the location of the primary touch at 1320. At 1330, a secondary or second touch can be detected on the surface which can trigger an offset of the cursor based at least in part on the original position of the cursor. The offset can be removed and the cursor can return to its original location by removing the secondary finger from the surface.

In FIG. 14, there is a flow diagram illustrating an exemplary method 1400 that facilitates enhancing cursor selection of smaller targets whereby the second contact can stretch and enlarge an area surrounding the current cursor position (e.g., established by a primary finger). The method 1400 involves setting an anchor location based on the primary finger's location or position on the surface at 1410. At 1420, a point on an edge or a corner of a square zoom area can be identified based on a secondary finger's location on the surface. At 1430, content within the squared zoom area can be adaptively scaled as the secondary finger moves away from or closer to the primary finger. For example, moving the secondary finger closer to the primary finger zooms in on the content within the zoom area, thus making it appear smaller. Similarly, moving the secondary finger away from the primary finger effectively magnifies the content within the zoom area. The primary finger's location can be the center of the zoom area. By stretching a particular portion of the surface in this manner, a selection target can be more readily viewed and hit with much greater success.

Turning now to FIG. 15, an exemplary method 1500 is presented that facilitates enhancing cursor selection of smaller targets whereby a sliding movement by the second contact can alter the cursor speed upward or downward depending on the direction of the slide. The method 1500 involves visualizing a cursor on the surface of a multi-touch screen at 1510 at a position or location established by a primary finger, for example. At 1520, the presence and location of a secondary finger on the screen surface can be detected. At 1530, the cursor's speed can be controlled while the cursor is being moved by performing at least one of the following: moving the secondary finger closer to the primary finger location to reduce cursor speed an amount based on distance moved; and moving the secondary finger away from the primary finger location to increase cursor speed an amount based on distance moved. A maximum and a minimum speed can be set. For example, the maximum speed can be considered the normal speed of the cursor—e.g., the cursor in its normal or default state. The minimum speed can be a frozen state, whereby the cursor is not allowed to move until unfrozen.

Though not specifically indicated hereinabove, the subject systems and methods can be employed in any computing environment where a multi-touch screen is available. For example, the multi-touch screen may be found on a desktop, laptop, or tabletop device or even other portable devices with touch screens.

Figure 16:
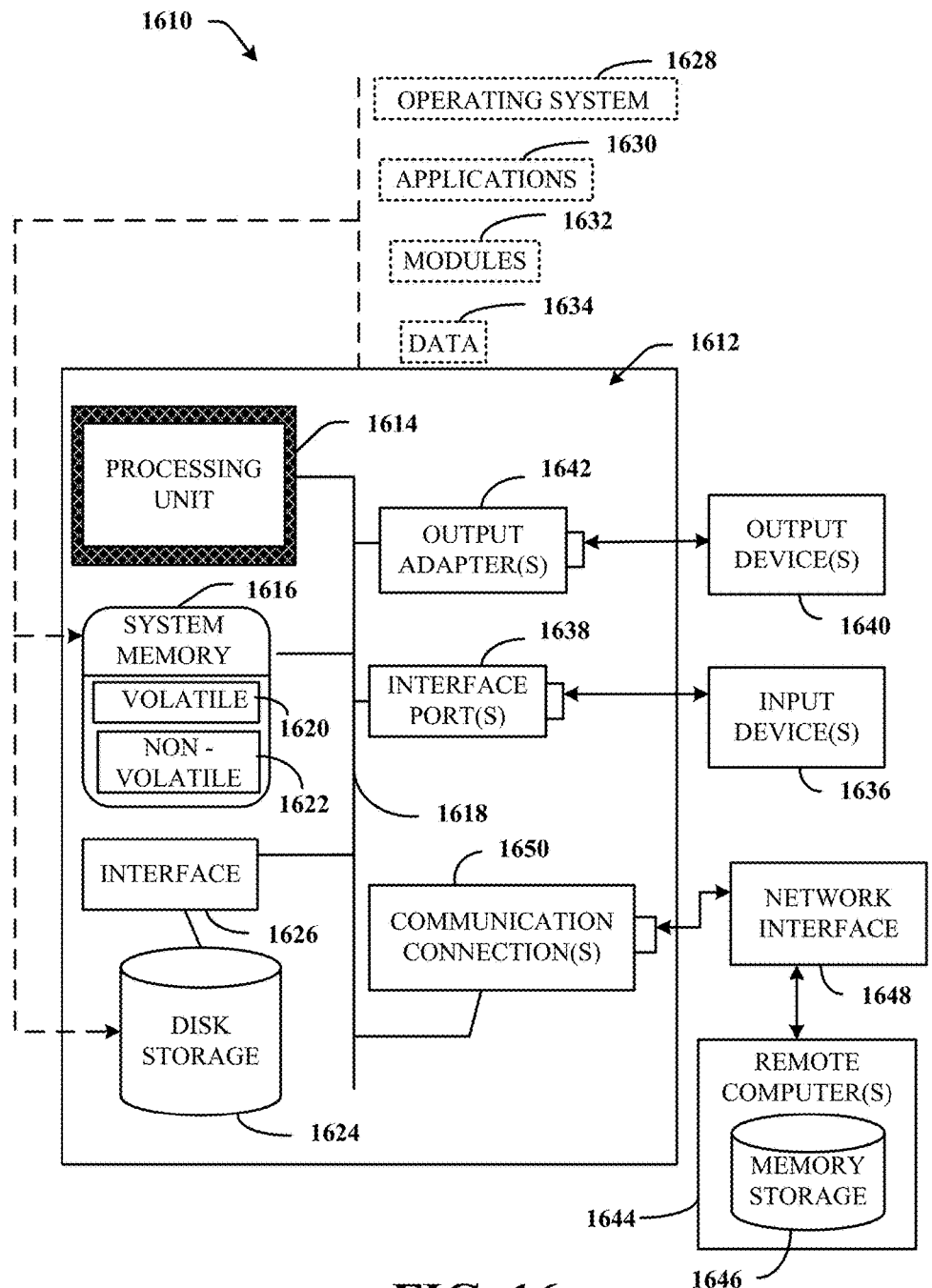
FIG. 16 illustrates an exemplary environment for implementing various aspects of the invention.

In order to provide additional context for various aspects of the subject invention, FIG. 16 and the following discussion are intended to provide a brief, general description of a suitable operating environment 1610 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1610 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 16, an exemplary environment 1610 for implementing various aspects of the invention includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/nonremovable, volatile/nonvolatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the subject invention can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612 and to output information from computer 1612 to an output device 1640. Output adapter 1642 is provided to illustrate that there are some output devices 1640 like monitors, speakers, and printers among other output devices 1640 that require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
one or more processors; and
one or more memories, storing processor-executable instructions that, when executed by the one or more processors, cause the one or more processors to perform acts comprising:
tracking multi-touch input to a multi-touch screen, the multi-touch input comprising an input received from a primary member and an input received from a secondary member;
disambiguating between the input received from the primary member and the input received from the secondary member;
controlling a movement of a cursor based on the input received from the primary member while modifying an assistance mode for manipulation of the cursor based on the input received from the secondary member, the assistance mode including adjusting a control-display ratio of a content selected based on the input received from the secondary member; and
invoking a menu including a plurality of selection areas in response to detecting that the secondary member has established contact with the multi-touch screen and at least one selection area to adjust a speed of the cursor, the plurality of selection areas comprising at least a magnify selection area to invoke a magnify mode that presents a magnified image of content underneath the cursor, wherein the magnified image acts as a lens showing a portion of an interface obstructed by the primary member.

2. The system as recited in claim 1, wherein the primary member overlaps the cursor.

3. The system as recited in claim 1, wherein the magnify mode is invoked in response to detecting movement of the secondary member into the magnify selection area.

4. The system as recited in claim 1, wherein the at least one selection area to adjust the speed of the cursor comprises:
a normal cursor speed selection area to adjust the speed of the cursor to a normal mode in which the cursor moves at a same speed as the primary member; and
at least one slow cursor speed selection area to adjust the speed of the cursor to a slow mode in which the cursor moves at a slower speed than the primary member.

5. The system as recited in claim 4, wherein the at least one slow cursor speed selection area comprises:
a first slow cursor speed selection area to adjust the speed of the cursor to a first slow mode in which the cursor moves at a first reduced speed relative to the primary member; and
a second slow cursor speed selection area to adjust the speed of the cursor to a second slow mode in which the cursor moves at a second reduced speed relative to the primary member that is different from the first reduced speed.

6. The system as recited in claim 4, wherein the at least one slow cursor speed selection area comprises a cursor speed selection area to freeze the cursor in place.

7. The system as recited in claim 1, wherein the menu further comprises a selection area to return the cursor to a current location of the primary member.

8. The system as recited in claim 1, wherein:
the menu includes a circular menu; and
the circular menu is positioned such that the secondary member is located at a center of the circular menu when the menu is invoked in response to detecting that the secondary member has established contact with the multi-touch screen.

9. One or more memories, storing processor-executable instructions that, when executed by one or more processors, cause the one or more processors to perform acts comprising:
tracking multi-touch input to a multi-touch screen based on an input received from a primary member and an input received from a secondary member;
activating a cursor based on the input from the primary member;
enabling cursor movement control based on the input received from the primary member concurrently with adjusting a control-display ratio of a content selected based on the input received from the secondary member, in response to detecting that the secondary member has established contact with the multi-touch screen; and
invoking a menu including a plurality of selection areas in response to detecting that the secondary member has established contact with the multi-touch screen and at least one selection area to adjust a speed of the cursor, the plurality of selection areas comprising at least a magnify selection area to invoke a magnify mode that presents a magnified image of content underneath the cursor, wherein the magnified image acts as a lens showing a portion of an interface obstructed by the primary member.

10. The one or more memories as recited in claim 9, the acts further comprising:
detecting movement of the secondary member into a normal cursor speed selection area of a plurality of selection areas; and
adjusting the speed of the cursor to a normal mode in which the cursor moves at a same speed as the primary member.

11. The one or more memories as recited in claim 9, the acts further comprising:
detecting movement of the secondary member into a first slow cursor speed selection area of the plurality of selection areas; and
adjusting the speed of the cursor to a first slow mode in which the cursor moves at a first reduced speed relative to the primary member.

12. The one or more memories as recited in claim 11, the acts further comprising:
detecting movement of the secondary member into a second slow cursor speed selection area of the plurality of selection areas; and
adjusting the speed of the cursor to a second slow mode in which the cursor moves at a second reduced speed relative to the primary member that is different from the first reduced speed.

13. The one or more memories as recited in claim 9, the acts further comprising:
detecting movement of the secondary member into a cursor speed selection area of the plurality of selection areas; and
freezing the cursor in place.

14. A method comprising:
under control of one or more processors, tracking multi-touch input to a multi-touch screen based on an input received from a primary member and an input received from a secondary member;
activating a cursor based on the input from the primary member; and
enabling cursor movement control based on the input received from the primary member concurrently with adjusting a control-display ratio of a content selected based on the input received from the secondary member, in response to detecting that the secondary member has established contact with the multi-touch screen; and
invoking a menu including a plurality of selection areas in response to detecting that the secondary member has established contact with the multi-touch screen and at least one selection area to adjust a speed of the cursor, the plurality of selection areas comprising at least a magnify selection area to invoke a magnify mode that presents a magnified image of content underneath the cursor, wherein the magnified image acts as a lens showing a portion of an interface obstructed by the primary member.

15. The method as recited in claim 14, further comprising returning the cursor to a current location of the primary member in response to detecting movement of the secondary member into a second selection area.

16. The method as recited in claim 14, further comprising invoking a menu comprising a plurality of selection areas in response to detecting that the secondary member has established contact with the multi-touch screen, the invoking including presenting the menu as a circular menu that is positioned such that the secondary member is located at a center of the circular menu when the menu is invoked.

17. The method as recited in claim 14, further comprising adjusting a speed of the cursor in response to detecting movement of the secondary member into a selection area.

18. The method as recited in claim 17, wherein adjusting the speed of the cursor includes at least one of:
adjusting the speed of the cursor to a normal mode in which the cursor moves at a same speed as the primary member;
adjusting the speed of the cursor to a first slow mode in which the cursor moves at a first reduced speed relative to the primary member;
adjusting the speed of the cursor to a second slow mode in which the cursor moves at a second reduced speed relative to the primary member that is different from the first reduced speed; or
freezing the cursor in place.

19. The system as recited in claim 1, further comprising returning the cursor to a default state in response to detecting that the secondary member is removed from the multi-touch screen.

* * * * *